United States Patent
Kuehner (10) Patent No.: US 11,584,385 B2
(45) Date of Patent: Feb. 21, 2023

(54) RECONFIGURABLE THROTTLE-BY-WIRE PEDAL SUBSYSTEM FOR A VEHICLE AND ASSOCIATED METHODS

(71) Applicant: Toyota Research Institute, Inc., Los Altos, CA (US)

(72) Inventor: Manuel Ludwig Kuehner, Hassmersheim (DE)

(73) Assignee: Toyota Research Institute, Inc., Los Altos, CA (US)

( * ) Notice: Subject to any disclaimer, the term of this patent is extended or adjusted under 35 U.S.C. 154(b) by 178 days.

(21) Appl. No.: 17/114,758

(22) Filed: Dec. 8, 2020

(65) Prior Publication Data

US 2022/0176981 A1 Jun. 9, 2022

(51) Int. Cl.
*B60W 50/10* (2012.01)
*B60W 50/02* (2012.01)
(Continued)

(52) U.S. Cl.
CPC ........... *B60W 50/10* (2013.01); *B60K 26/021* (2013.01); *B60W 10/06* (2013.01); *B60W 10/18* (2013.01);
(Continued)

(58) Field of Classification Search
CPC ...... B60W 50/10; B60W 10/06; B60W 10/18; B60W 30/0956; B60W 30/146; B60W 40/08; B60W 50/0205; B60W 50/16; B60W 2540/225; B60W 2540/10; B60W 2540/22; B60K 20/021; B60K 2026/022
See application file for complete search history.

(56) References Cited

U.S. PATENT DOCUMENTS

| 3,709,338 A | 1/1973 | Glen |
| 4,273,211 A | 6/1981 | Sarmiento |

(Continued)

FOREIGN PATENT DOCUMENTS

| BR | 102012011753 A2 | 4/2014 |
| WO | 1990003897 A1 | 4/1990 |
| WO | 2004020240 A1 | 3/2004 |

OTHER PUBLICATIONS

Lambert, "Nissan Next-Gen Leaf Has 'e-Pedal' Feature for One-Pedal Driving with Regenerative Braking," electrek, Jul. 19, 2017, found at https://electrek.co/2017/07/19/nissan-next-gen-leaf-e-pedal-driving-regenerative-braking/.

(Continued)

*Primary Examiner* — Hussein Elchanti
(74) *Attorney, Agent, or Firm* — Christopher G. Darrow; Darrow Mustafa PC (57) ABSTRACT

The embodiments described herein concern a reconfigurable throttle-by-wire pedal subsystem for a vehicle and associated methods. One embodiment detects a pedal error in which a driver of the vehicle mistakenly actuates an accelerator foot pedal unit of the vehicle instead of a separate brake pedal of the vehicle, the accelerator foot pedal unit controlling a throttle of the vehicle, and performs the following in response to the detected pedal error: reconfiguring the accelerator foot pedal unit to control a braking subsystem of the vehicle instead of the throttle and reconfiguring a haptic feedback of the accelerator foot pedal unit from a throttle-by-wire mode to a brake-by-wire mode.

20 Claims, 3 Drawing Sheets

(51) Int. Cl.
    *B60W 30/14*          (2006.01)
    *B60K 26/02*          (2006.01)
    *B60W 30/095*        (2012.01)
    *B60W 40/08*          (2012.01)
    *B60W 10/06*          (2006.01)
    *B60W 50/16*          (2020.01)
    *B60W 10/18*          (2012.01)

(52) U.S. Cl.
    CPC ...... *B60W 30/0956* (2013.01); *B60W 30/146* (2013.01); *B60W 40/08* (2013.01); *B60W 50/0205* (2013.01); *B60W 50/16* (2013.01); *B60K 2026/022* (2013.01); *B60W 2540/10* (2013.01); *B60W 2540/22* (2013.01); *B60W 2540/225* (2020.02)

(56) References Cited

U.S. PATENT DOCUMENTS

| | | | |
|---|---|---|---|
| 5,596,906 | A | 1/1997 | Lin |
| 7,188,546 | B2 | 3/2007 | Olofsson |
| 9,043,086 | B1 * | 5/2015 | Gauthier ............... G05G 1/40 |
| | | | 74/513 |
| 2004/0139818 | A1 | 7/2004 | Naruse |
| 2004/0187629 | A1 * | 9/2004 | Koo .................... B60T 7/06 |
| | | | 74/560 |
| 2010/0256854 | A1 * | 10/2010 | Feder ................... B60W 50/16 |
| | | | 701/31.4 |
| 2012/0322616 | A1 * | 12/2012 | Fukui ................... B60W 50/10 |
| | | | 477/94 |
| 2013/0041564 | A1 * | 2/2013 | Doi ..................... B60W 50/087 |
| | | | 701/70 |
| 2014/0067203 | A1 * | 3/2014 | Kim ..................... B60W 50/16 |
| | | | 701/36 |
| 2015/0012198 | A1 * | 1/2015 | Kumazawa ............ B60T 7/22 |
| | | | 701/1 |
| 2016/0004271 | A1 * | 1/2016 | Gregory ............... B60W 20/10 |
| | | | 74/513 |
| 2017/0349185 | A1 * | 12/2017 | McNew ............... B60W 30/16 |
| 2018/0156329 | A1 * | 6/2018 | Hose ................ B60W 30/18118 |
| 2018/0252178 | A1 * | 9/2018 | Payne .................. B60W 20/00 |
| 2018/0362076 | A1 * | 12/2018 | Rowell .................... B62D 6/04 |
| 2021/0061274 | A1 * | 3/2021 | Escalante ............. B60W 10/10 |
| 2021/0278872 | A1 * | 9/2021 | Battlogg ............. G06F 3/0338 |
| 2022/0176981 | A1 * | 6/2022 | Kuehner ............. B60K 26/021 |

OTHER PUBLICATIONS

"Brake-Throttle Override Becomes the New Standard," Business Insider, May 23, 2012, found at https://www.businessinsider.com/brake-throttle-override-becomes-the-new-standard-2012-5.

Graham-Rowe, "Combined Accelerator and Brake Pedal Could Save Lives," NewScientist, Jan. 10, 2002, found at https://www.newscientist.com/article/dn1770-combined-accelerator-and-brake-pedal-could-save-lives/.

* cited by examiner

RECONFIGURABLE THROTTLE-BY-WIRE PEDAL SUBSYSTEM FOR A VEHICLE AND ASSOCIATED METHODS

TECHNICAL FIELD

The subject matter described herein relates in general to vehicles and, more specifically, to a reconfigurable throttle-by-wire pedal subsystem for a vehicle and associated methods.

BACKGROUND

As a driver is controlling a vehicle, the driver may depress the accelerator at a time when the driver should instead apply the brakes. For example, a startled driver who suddenly becomes aware of on obstacle on the roadway may become flustered and accidentally depress the accelerator even further, causing the vehicle to speed up and collide with the obstacle, when the driver's actual intention was to apply the brakes. Such a driving error can result in an accident involving injury or even loss of life.

SUMMARY

An example of a throttle-by-wire pedal subsystem for a vehicle is presented herein. The throttle-by-wire pedal subsystem comprises one or more processors; an accelerator foot pedal unit communicably coupled to the one or more processors, the accelerator foot pedal unit controlling a throttle of the vehicle; and a memory communicably coupled to the one or more processors. The memory stores a pedal error detection module including instructions that when executed by the one or more processors cause the one or more processors to detect a pedal error in which a driver of the vehicle mistakenly actuates the accelerator foot pedal unit instead of a separate brake pedal of the vehicle. The memory also stores a control module including instructions that when executed by the one or more processors cause the one or more processors, in response to the detected pedal error, to reconfigure the accelerator foot pedal unit to control a braking subsystem of the vehicle instead of the throttle and to reconfigure a haptic feedback of the accelerator foot pedal unit from a throttle-by-wire mode to a brake-by-wire mode.

Another embodiment is a non-transitory computer-readable medium for controlling a throttle-by-wire pedal subsystem of a vehicle and storing instructions that when executed by one or more processors cause the one or more processors to detect a pedal error in which a driver of the vehicle mistakenly actuates an accelerator foot pedal unit of the vehicle instead of a separate brake pedal of the vehicle, wherein the accelerator foot pedal unit controls a throttle of the vehicle. The instructions also cause the one or more processors to perform the following in response to the detected pedal error: reconfigure the accelerator foot pedal unit to control a braking subsystem of the vehicle instead of the throttle and reconfigure a haptic feedback of the accelerator foot pedal unit from a throttle-by-wire mode to a brake-by-wire mode.

Another embodiment is a method of controlling a throttle-by-wire pedal subsystem of a vehicle. The method comprises detecting a pedal error in which a driver of the vehicle mistakenly actuates an accelerator foot pedal unit of the vehicle instead of a separate brake pedal of the vehicle, wherein the accelerator foot pedal unit controls a throttle of the vehicle. The method also includes performing the following in response to the detected pedal error: reconfiguring the accelerator foot pedal unit to control a braking subsystem of the vehicle instead of the throttle and reconfiguring a haptic feedback of the accelerator foot pedal unit from a throttle-by-wire mode to a brake-by-wire mode.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

A driver mistakenly depressing the accelerator instead of applying the brakes is herein termed a "pedal error." The embodiments described herein can mitigate a pedal error by automatically detecting the pedal error and dynamically reconfiguring a throttle-by-wire accelerator pedal to function as a brake-by-wire pedal. That is, the throttle-by-wire accelerator pedal is temporarily reconfigured electronically to permit the driver to control the vehicle's brakes instead of the throttle. While the accelerator pedal is reconfigured as a brake-by-wire pedal, the haptic feedback of the accelerator pedal feels, to the driver, like a brake pedal instead of an accelerator pedal. For example, the force resisting the driver's foot can be increased to feel like a brake pedal. In one embodiment, when the driver reduces pressure on the accelerator pedal to a predetermined level (e.g., to no pressure at all or to a small predetermined threshold level of pressure), the throttle-by-wire pedal subsystem in the vehicle cancels reconfiguration of the accelerator pedal so that the accelerator pedal again functions as an accelerator pedal, and the haptic feedback of the accelerator pedal reverts to its normal state. In another embodiment, the driver must completely release pressure on the accelerator pedal and at least momentarily press on the vehicle's separate brake pedal to cancel reconfiguration of the accelerator pedal. In some embodiments, the throttle-by-wire pedal subsystem, upon detecting a pedal error, reconfigures the accelerator pedal as a brake-by-wire pedal only if the vehicle is traveling at a speed slower than a predetermined speed threshold.

Figure 1:
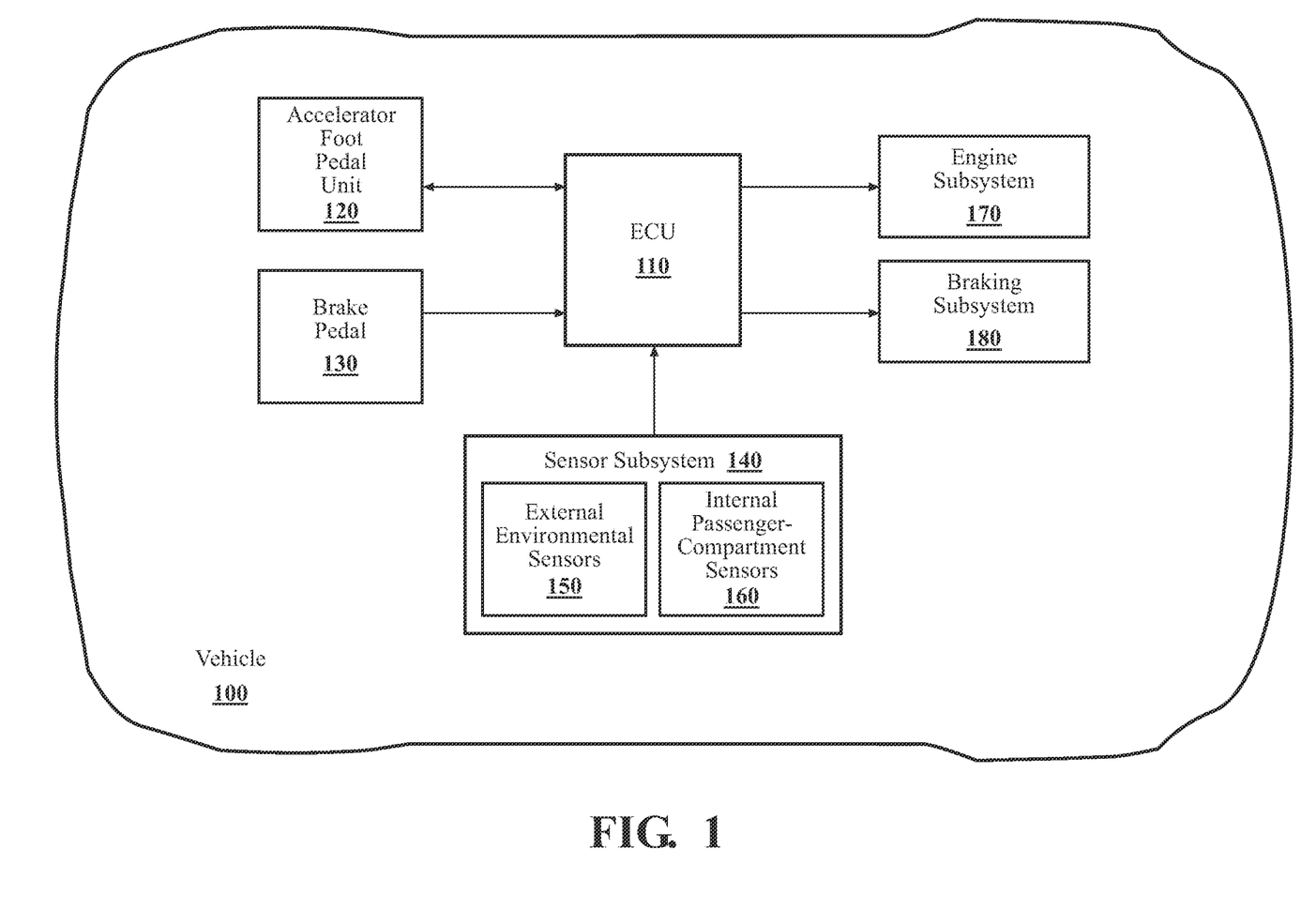
FIG. 1 illustrates one embodiment of a vehicle within which a reconfigurable throttle-by-wire pedal subsystem may be implemented.

Referring to FIG. 1, an example of a vehicle 100 is illustrated. As used herein, a "vehicle" is any form of motorized transport. While arrangements will be described herein with respect to automobiles, it will be understood that embodiments are not limited to automobiles. In some implementations, the vehicle 100 may be any other form of motorized transport.

The vehicle 100 also includes various elements. It will be understood that vehicle 100 can include other elements in addition to those shown in FIG. 1. Some of the possible elements of vehicle 100 pertaining to the embodiments described herein are shown in FIG. 1 and will be described in greater detail in connection with subsequent figures. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

In the embodiment shown in FIG. 1, the vehicle 100 includes an electronic control unit (ECU) 110. In this embodiment, ECU 110 receives input (e.g., a current position or angle of a throttle-by-wire accelerator foot pedal relative to a reference position) from accelerator foot pedal unit 120 to control the throttle of engine subsystem 170. Accelerator foot pedal unit 120 is communicably coupled to one or more processors belonging to ECU 110, as discussed further below in connection with FIG. 2. In some embodiments, accelerator foot pedal unit 120 includes an accelerator pedal and other components for a throttle-by-wire pedal such as position sensors and an analog-to-digital converter (not shown in FIG. 1) so that accelerator foot pedal unit 120 can function as part of a throttle-by-wire subsystem of vehicle 100. ECU 110 also receives input from a brake pedal 130, which, in this embodiment, is a brake-by-wire pedal unit that is separate from the accelerator pedal in the accelerator foot pedal unit 120. The brake pedal 130 permits a driver to control the vehicle's braking subsystem 180 via ECU 110. In other embodiments, brake pedal 130 is a conventional (mechanical, non-brake-by-wire) brake pedal.

In some embodiments, vehicle 100 is an electric vehicle or a hybrid electric and internal-combustion-engine vehicle. In such a vehicle, accelerator foot pedal unit 120 interfaces with ECU 110, as depicted in FIG. 1, but when vehicle 100 is operating in an electric propulsion mode, accelerator foot pedal unit 120 controls an apparatus such as an acceleration potentiometer that, in turn, controls an electric motor. Herein, the acceleration potentiometer or equivalent apparatus is sometimes referred to as a "throttle," drawing an analogy between an internal-combustion-engine vehicle and an electric vehicle. In other words, the term "throttle," as used herein, refers to either an engine throttle of an internal combustion engine or an acceleration potentiometer or equivalent apparatus of an electric vehicle. In a hybrid vehicle, accelerator foot pedal unit 120 can control either type of acceleration mechanism via ECU 110, depending on the current operational mode of the vehicle.

ECU 110 also receives input sensor data from a sensor subsystem 140, which includes both external environmental sensors 150 and internal passenger-compartment sensors 160. External environmental sensors 150 can include, for example, cameras, Light Detection and Ranging (LIDAR) sensors, radar sensors, and sonar sensors to sense the environment surrounding a vehicle 100. Sensing the external environment can include, for example, detecting objects in the environment surrounding vehicle 100. Such objects can include, for example, other road users (other vehicles, pedestrians, cyclists, etc.), features of the roadway on which vehicle 100 is traveling (e.g., lane lines, road signs, traffic signals, etc.), and potential obstacles or hazards.

Internal passenger-compartment sensors 160 can include, for example, cameras, tactile sensors (e.g., to measure how tightly the driver is gripping the steering wheel and whether the driver has one or both hands on the steering wheel), sound sensors, and, in some embodiments, biometric sensors that monitor physiological characteristics of the occupants of a vehicle 100, in particular the driver. For example, cameras can be used to detect the driver's gaze direction, identify particular facial expressions (e.g., surprise or shock) on the driver's face, and detect that a passenger in vehicle 100 is gesturing to the driver to warn the driver of a potential hazardous condition. The sound sensors, in conjunction with a speech recognition algorithm, can determine, for example, whether the driver or another vehicle occupant has uttered an exclamation such as "Oh!", "Look out!", or "Heads up!". In some embodiments, biometric sensors can measure the driver's heartrate, respiration, and other biological characteristics to support an algorithm that estimates the driver's emotional state.

Some examples of how the sensor data output by the external environmental sensors 150 and the internal passenger-compartment sensors 160 can be analyzed to detect a pedal error are discussed in greater detail below in connection with FIG. 2.

Figure 2:
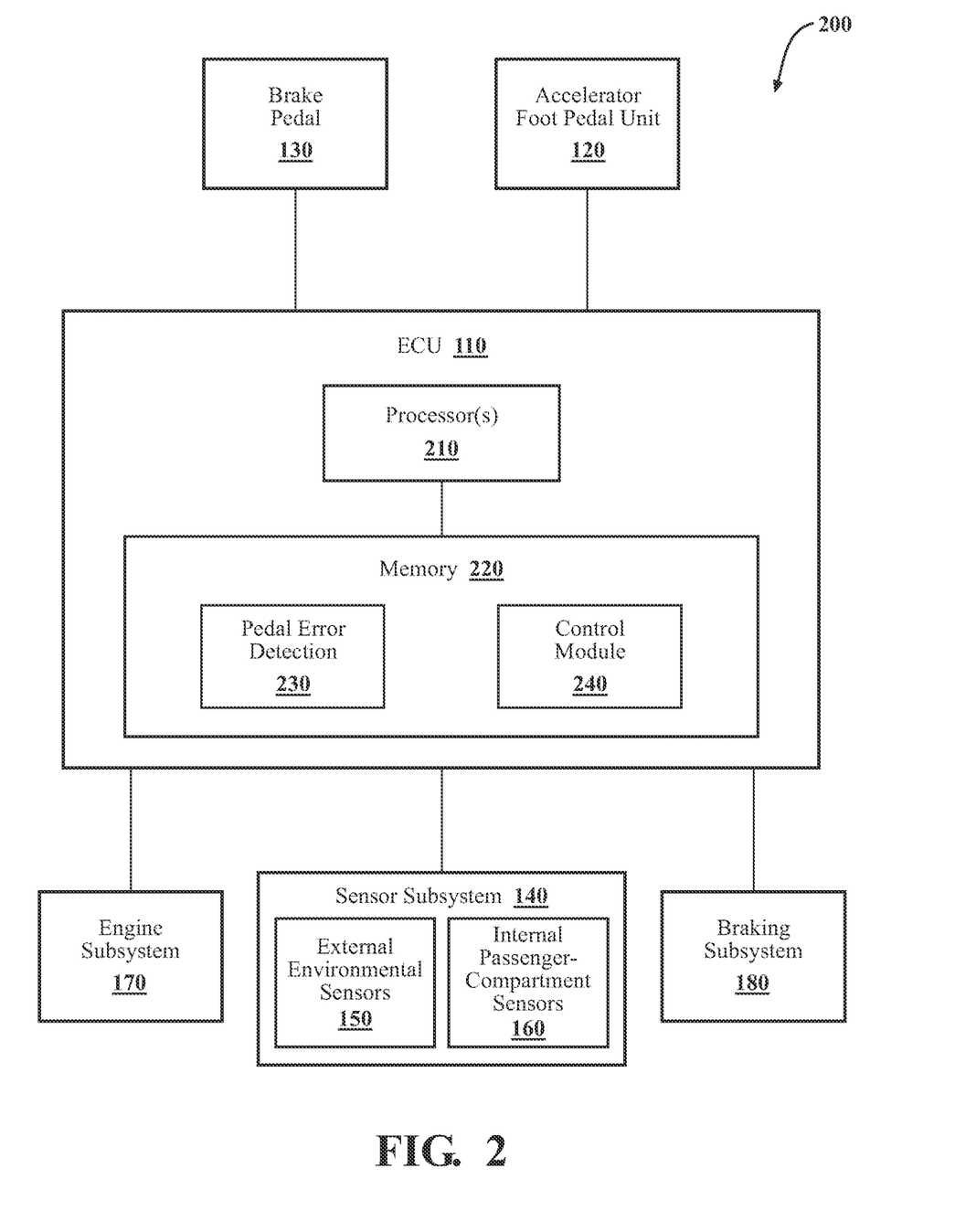
FIG. 2 illustrates one embodiment of a throttle-by-wire pedal subsystem for a vehicle.

FIG. 2 illustrates one embodiment of a throttle-by-wire pedal subsystem 200 for a vehicle. As shown in FIG. 2, ECU 110 includes one or more processors 210 and a memory 220 communicably coupled with the one or more processors 210. In this embodiment, memory 220 stores a pedal error detection module 230 and a control module 240. The memory 220 is a random-access memory (RAM), read-only memory (ROM), flash memory, or other suitable memory for storing the modules 230 and 240. The modules 230 and 240 are, for example, computer-readable instructions that when executed by the one or more processors 210, cause the one or more processors 210 to perform the various functions disclosed herein. In some embodiments, the modules 230 and 240 can be updated as needed (e.g., memory 220 can be re-flashed or otherwise updated).

As discussed above in connection with FIG. 1, ECU 110 communicates with accelerator foot pedal unit 120 and brake pedal 130. ECU 110 also receives input sensor data from sensor subsystem 140, which includes external environmental sensors 150 and internal passenger-compartment sensors 160. ECU 110 controls the throttle of engine subsystem 170 and braking subsystem 180 based on input from accelerator foot pedal unit 120 and brake pedal 130, respectively, as discussed above. As also discussed above, in some embodiments, vehicle 100 is an electric or hybrid vehicle, and the "throttle" corresponds to an apparatus such as an acceleration potentiometer that regulates an electric motor of an electric vehicle or a hybrid vehicle operating in an electric-propulsion mode. As discussed further below, when pedal error detection module 230 detects a pedal error, control module 240 can temporarily reconfigure accelerator foot pedal unit 120 to behave and feel, to the driver of a vehicle 100, like a brake-by-wire pedal instead of an accelerator pedal.

Pedal error detection module 230 generally includes instructions that when executed by the one or more processors 210 cause the one or more processors 210 to detect a pedal error in which a driver of the vehicle mistakenly actuates the accelerator foot pedal unit 120 instead of the separate brake pedal 130 of the vehicle 100. How pedal error detection module 230 detects a pedal error varies, depending on the embodiment. In general, pedal error detection module 230 detects a pedal error by analyzing sensor data from external environmental sensors 150, internal passenger-compartment sensors 160, or both. Thus, pedal error detection module 230 can monitor the external environment in the vicinity of a vehicle 100 and, at the same time, monitor occupants of vehicle 100, particularly the driver, in the passenger compartment (interior) of the vehicle 100. Some illustrative embodiments are discussed below.

In some embodiments, detecting a pedal error includes detecting one or more objects in the external environment of the vehicle 100 based on sensor data from external environmental sensors 150. For example, the external environmental sensor data can be analyzed to identify features of the roadway such as lane markings, intersections, road signs, and traffic lights. The external environment sensor data can also be analyzed to identify objects such as other road users (other vehicles, pedestrians, cyclists, etc.). The environmental sensor data can also be analyzed to identify potential obstacles (barricades, road construction equipment, foreign objects on the roadway, etc.). Identifying roadway features, other road users, and potential obstacles permits pedal error detection module 230 to perform "scene understanding" to ascertain the context in which vehicle 100 is currently operating and what potential hazards or dangers might exist in the near future to which a driver might react incorrectly, resulting in a pedal error.

In some embodiments, detecting a pedal error includes monitoring the driver and, in some embodiments, other vehicle occupants (passengers) via internal passenger-compartment sensors 160. Such sensors can include, for example, cameras; audio sensors; biometric sensors that monitor heartrate, respiration, and other physiological-state information of the driver; and tactile sensors located on, for example, the steering wheel. Several examples of analyzing sensor data from internal passenger-compartment sensors 160 to monitor vehicle occupants are presented below.

For example, monitoring the driver could include analyzing the internal passenger-compartment sensor data to detect the gaze direction of the driver. Detecting the gaze direction permits pedal error detection module 230 to determine whether the driver is looking in the direction of a potential hazard, which can indicate whether or not the driver is aware of the potential hazard at a particular point in time.

Another example is detecting a facial expression (e.g., shock, surprise, fear) of the driver based on the internal passenger-compartment sensor data (e.g., image data from one or more interior cameras). Such an expression can indicate that the driver has become aware of a potential danger and is responding to it or is about to respond to it. In that kind of situation and under that kind of stress, the driver might commit a pedal error.

Another example is detecting the emotional state of the driver based on the internal passenger-compartment sensor data, in particular biometric sensor data, as discussed above. Detecting a sudden increase in the driver's heartrate, e.g., can indicate a condition of stress, excitation, or fear associated with a "fight or flight response," as can a sudden change in respiration (e.g., breathing more rapidly and shallowly). In such a situation, a pedal error is more likely to occur.

Another example is detecting a spoken exclamation (e.g., "Oh!", "Look out!", "Heads up!", etc.), a facial expression, and/or a gesture from a passenger in vehicle 100. If a driver faces a potential danger (e.g., from another road user or obstacle), a passenger in the vehicle might try to warn the driver by shouting and/or gesturing (e.g., pointing in the direction of the potential hazard), and the passenger's facial expression may also simultaneously reflect concern or fear. This kind of information can also be taken into account in detecting pedal errors.

Another example is detecting a sudden increase in pressure on the accelerator foot pedal unit 120 based on the internal passenger-compartment sensor data. Such a sudden increase in pressure on the accelerator pedal might indicate that the driver intended to press the separate brake pedal 130 instead, especially if the driver simultaneously exhibits a shocked, surprised, or fearful facial expression.

Another example is detecting a change, particularly a sudden change, in the grip of the driver on the steering wheel of the vehicle 100 based on the internal passenger-compartment sensor data. In such an embodiment, the steering wheel includes sensors to detect how tightly the driver is gripping the steering wheel and with how many hands the driver is gripping the steering wheel. If the driver is gripping the steering wheel with one hand and suddenly adds the other hand, it could indicate that the driver is reacting to a perceived hazard or danger. If the driver is gripping the steering wheel with one or both hands and suddenly tightens his or her grip on the steering wheel, that could also indicate that the driver is reacting to a perceived hazard or danger. Such urgent, hurried responses can sometimes be associated with a pedal error.

Information like that obtained in the preceding examples can be used in combination in a wide variety of ways to identify a situation in which the driver intends to apply the brakes but instead mistakenly presses on the accelerator pedal—a pedal error. For example, a driver might not see an obstacle the vehicle 100 is approaching (based on an analysis of the driver's gaze direction) and then, after looking in the direction of the obstacle, might suddenly press on the accelerator pedal sharply with greater pressure while wearing a shocked or frightened facial expression. In such a case, pedal error detection module 230, based on this combination of indicators, might determine that the driver has committed a pedal error. The foregoing is merely one example of how external and internal sensor data can be analyzed and fused to detect a pedal error. Many other scenarios are possible in which various indicators obtained from analyzing external and/or internal sensor data can be combined to detect a pedal error with high probability.

In some embodiments, pedal error detection module 230 detects pedal errors using a rule-based algorithm that takes, as inputs, the kinds of information discussed in the foregoing examples. In other embodiments, such information can be input to a machine-learning-based algorithm trained to detect pedal errors.

Depending on the particular embodiment, the functionality of pedal error detection module 230 can be implemented in a variety of ways. For example, in some embodiments, pedal error detection module 230 is an aspect of an Advanced Driver-Assistance System (ADAS) or a semi-autonomous driving system in vehicle 100.

Control module 240 generally includes instructions that when executed by the one or more processors 210 cause the one or more processors 210 to (1) reconfigure the accelerator foot pedal unit 120 to control the braking subsystem 180 of the vehicle instead of the throttle of vehicle 100 and (2) reconfigure the haptic feedback of the accelerator foot pedal unit 120 from a throttle-by-wire mode that feels like an accelerator pedal to the driver to a brake-by-wire mode that feels like a brake pedal to the driver. The result is that the accelerator foot pedal unit 120 temporarily functions like and feels, to the driver of vehicle 100, like a brake-by-wire pedal instead of an accelerator pedal, effectively mitigating the driver's pedal error. Herein, "haptic feedback" refers to the way the accelerator foot pedal unit 120 feels to a driver whose foot is in contact with and pressing, to some degree, on the accelerator pedal—the resistance felt, etc.

Reconfiguring accelerator foot pedal unit 120 to control braking subsystem 180 involves ECU 110 switching its electronic control of the throttle, in response to input from accelerator foot pedal unit 120, to controlling braking subsystem 180 instead. In this context, the input from accelerator foot pedal unit 120 is the detected position of the pedal (e.g., its angle relative to a reference position when it is not being depressed by the driver).

Reconfiguring the haptic feedback of accelerator foot pedal unit 120 to feel like a brake-by-wire pedal (the brake-by-wire mode mentioned above), in some embodiments, includes adjusting (e.g., increasing) the resistance level of the accelerator foot pedal unit 12 by controlling a linear electric motor, a rotary electric motor, or an actuator based on a magnetorheological fluid. A magnetorheological fluid is sometimes referred to in the literature as a "smart fluid." The change in resistance can be nonlinear, meaning that as the accelerator foot pedal unit 120 is pressed further, the resistance increases to a maximum, at which point the pedal cannot be depressed further, just like a typical brake pedal.

Control module 240 can include further instructions that when executed by the one or more processors 210 cause the one or more processors 210, in response to a predetermined condition, to cancel temporary reconfiguration of the accelerator foot pedal unit 120. Upon cancelation of reconfiguration, the accelerator foot pedal unit 120 reverts to control of the throttle of the vehicle 100, and the haptic feedback of the accelerator foot pedal unit 120 reverts to the original throttle-by-wire mode, in which the accelerator foot pedal unit 120 feels, to the driver, like an accelerator pedal.

The predetermined condition triggering cancelation of the temporary reconfiguration of accelerator foot pedal unit 120 can vary, depending on the particular embodiment. In one embodiment, control module 240 cancels reconfiguration when the driver reduces pressure on the accelerator foot pedal unit 120 to a predetermined level. The predetermined level can be no pressure at all (e.g., the driver removes his or her foot from the accelerator pedal completely) or a predetermined small threshold level of pressure, depending on the embodiment. In a different embodiment, the driver must completely release pressure on accelerator foot pedal unit 120 and at least momentarily actuate the separate brake pedal 130 of vehicle 100 for control module 240 to cancel reconfiguration. In other words, reconfiguration is canceled when the driver removes his or her foot from the accelerator foot pedal unit 120 and presses on the separate brake pedal 130 at least momentarily.

In some embodiments, control module 240 temporarily reconfiguring accelerator foot pedal unit 120, as described above, is conditioned on the vehicle 100 traveling at a speed that falls below a predetermined speed threshold. In these embodiments, reconfiguration of accelerator foot pedal unit 120 to function temporarily as a brake-by-wire pedal is limited to relatively low speeds (e.g., below 10 mph) to avoid the possible risks associated with a "false positive" identification of a pedal error at higher speeds. In some embodiments, control module 240 adjusts the predetermined speed threshold in accordance with the current location of vehicle 100 (e.g., based on GPS coordinates). For example, control module 240, in one embodiment, might set a predetermined speed threshold of 20 mph in an urban environment and a higher predetermined speed threshold of 50 mph in a rural-highway environment.

Figure 3:
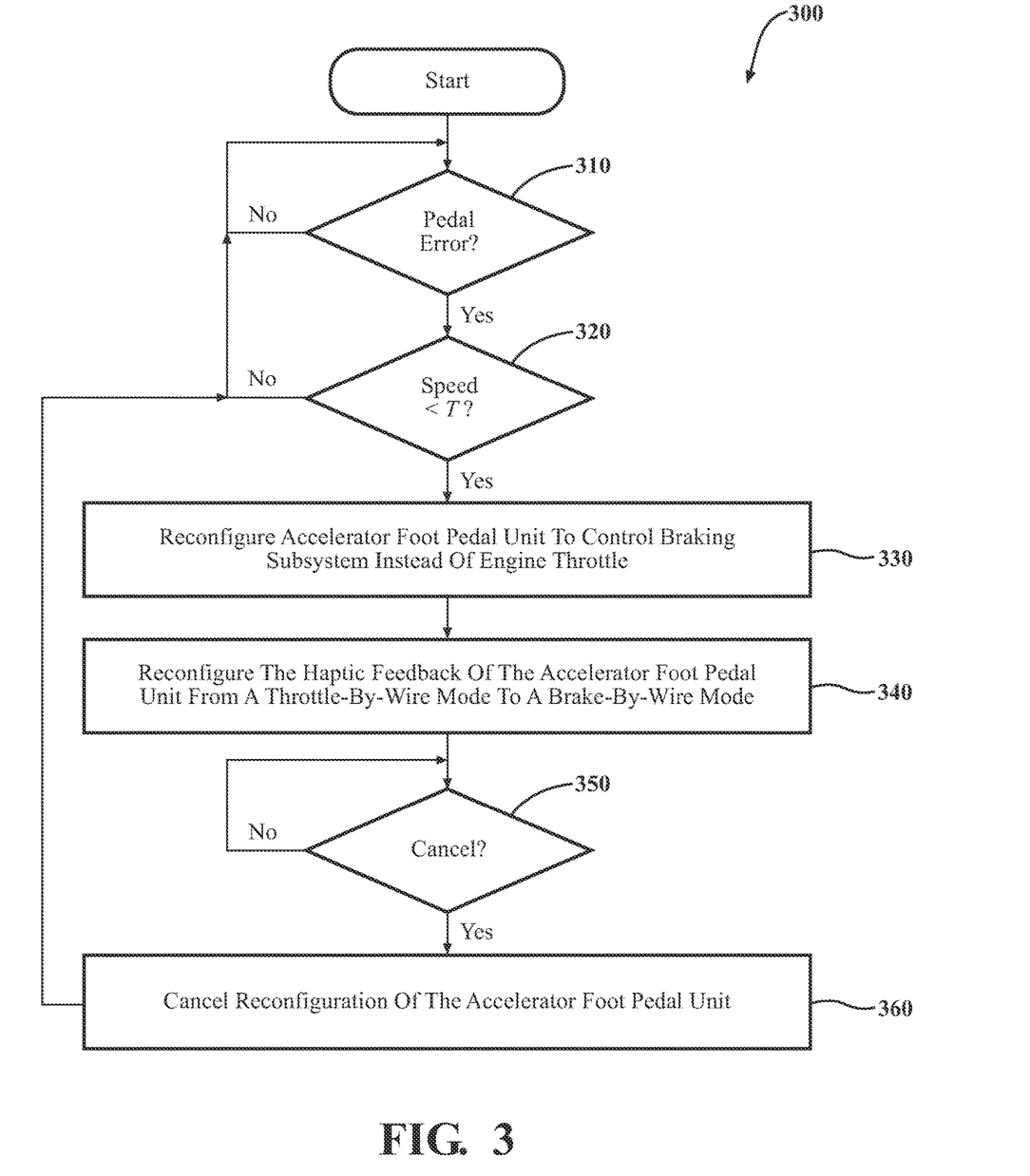
FIG. 3 is a flowchart of a method of controlling a throttle-by-wire pedal subsystem of a vehicle, in accordance with an illustrative embodiment of the invention.

FIG. 3 is a flowchart of a method 300 of controlling a throttle-by-wire pedal subsystem of a vehicle, in accordance with an illustrative embodiment of the invention. Method 300 will be discussed from the perspective of throttle-by-wire pedal subsystem 200 in FIG. 2. While method 300 is discussed in combination with throttle-by-wire pedal subsystem 200, it should be appreciated that method 300 is not limited to being implemented using throttle-by-wire pedal subsystem 200. Throttle-by-wire pedal subsystem 200 is instead one example of a system that may implement method 300.

At block 310, if pedal error detection module 230 detects a pedal error, control proceeds to block 320. As discussed above, in general, pedal error detection module 230 detects a pedal error by analyzing sensor data from external environmental sensors 150, internal passenger-compartment sensors 160, or both. A number of examples of how analyzing such sensor data can enable the detection of a pedal error are presented above.

At block 320, which is not part of method 300 in all embodiments, if the current speed of vehicle 100 falls below a predetermined speed threshold, control proceeds to block 330. Otherwise, control returns to block 310. As discussed above, in some embodiments, reconfiguration of accelerator foot pedal unit 120 to function temporarily as a brake-by-wire pedal is limited to relatively low speeds (e.g., below 10 mph) to avoid the possible risks associated with a "false positive" detection of a pedal error at higher speeds. In some embodiments, control module 240 adjusts the predetermined speed threshold in accordance with the current location of vehicle 100 (e.g., based on GPS coordinates).

At block 330, control module 240 reconfigures the accelerator foot pedal unit 120 to control the braking subsystem 180 of the vehicle 100 instead of the throttle (i.e., the throttle of engine subsystem 170 or an analogous apparatus such as an acceleration potentiometer, in embodiments in which vehicle 100 is an electric vehicle or a hybrid vehicle operating in an electric-propulsion mode). As discussed above, reconfiguring accelerator foot pedal unit 120 to control braking subsystem 180 involves ECU 110 switching its electronic control of the throttle, in response to input from accelerator foot pedal unit 120, to controlling braking subsystem 180 instead. In this context, the input from accelerator foot pedal unit 120 is the detected position of the pedal (e.g., its angle relative to a reference position when it is not being depressed by the driver).

At block 340, control module 240 reconfigures the haptic feedback of the accelerator foot pedal unit from a throttle-by-wire mode to a brake-by-wire mode. As discussed above, reconfiguring the haptic feedback of accelerator foot pedal unit 120 to feel like a brake-by-wire pedal (the brake-by-wire mode), in some embodiments, includes adjusting (e.g., increasing) the resistance level of the accelerator foot pedal unit 12 by controlling a linear electric motor, a rotary electric motor, or an actuator based on a magnetorheological fluid ("smart fluid").

At block 350, if control module 240 receives input from the driver of vehicle 100 that satisfies a predetermined condition, control proceeds to block 360. In one embodiment, the predetermined condition is that the driver reduces pressure on accelerator foot pedal unit 120 to a predetermined level (no pressure or a predetermined small threshold level of pressure). In another embodiment, the predetermined condition is that the driver must completely release pressure on accelerator foot pedal unit 120 (e.g., by removing his or her foot) and at least momentarily actuate the separate brake pedal 130 of vehicle 100.

At block 360, control module 240 cancels reconfiguration of accelerator foot pedal unit 120. Upon cancelation of the temporary reconfiguration, the accelerator foot pedal unit 120 reverts to control of the throttle of vehicle 100, and the haptic feedback of the accelerator foot pedal unit 120 reverts to the original throttle-by-wire mode. Control then returns to block 310.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-3, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

As used herein, "cause" or "causing" means to make, command, instruct, and/or enable an event or action to occur or at least be in a state where such event or action may occur, either in a direct or indirect manner.

Aspects herein can be embodied in other forms without departing from the spirit or essential attributes thereof. Accordingly, reference should be made to the following claims rather than to the foregoing specification, as indicating the scope hereof.

What is claimed is:

1. A throttle-by-wire pedal subsystem for a vehicle, the throttle-by-wire pedal subsystem comprising:
   one or more processors;
   an accelerator foot pedal unit communicably coupled to the one or more processors, the accelerator foot pedal unit controlling a throttle of the vehicle; and
   a memory communicably coupled to the one or more processors and storing:
   a pedal error detection module including instructions that when executed by the one or more processors cause the one or more processors to detect a pedal error in which a driver of the vehicle mistakenly actuates the accelerator foot pedal unit instead of a separate brake pedal of the vehicle; and
   a control module including instructions that when executed by the one or more processors cause the one or more processors, in response to the detected pedal error, to:
      reconfigure the accelerator foot pedal unit to control a braking subsystem of the vehicle instead of the throttle; and
      reconfigure a haptic feedback of the accelerator foot pedal unit from a throttle-by-wire mode to a brake-by-wire mode.

2. The throttle-by-wire pedal subsystem of claim 1, wherein the control module includes further instructions that when executed by the one or more processors cause the one or more processors, in response to a predetermined condition, to cancel reconfiguration of the accelerator foot pedal unit, the accelerator foot pedal unit reverting to control of the throttle of the vehicle and the haptic feedback of the accelerator foot pedal unit reverting to the throttle-by-wire mode.

3. The throttle-by-wire pedal subsystem of claim 2, wherein the predetermined condition is one of:
   the driver reducing pressure on the accelerator foot pedal unit to a predetermined level; and
   the driver completely releasing pressure on the accelerator foot pedal unit and actuating the separate brake pedal of the vehicle.

4. The throttle-by-wire pedal subsystem of claim 1, wherein the instructions in the control module to reconfigure a haptic feedback of the accelerator foot pedal unit from a throttle-by-wire mode to a brake-by-wire mode include instructions that when executed by the one or more processors cause the one or more processors to adjust a resistance level of the accelerator foot pedal unit by controlling one or more of a linear electric motor, a rotary electric motor, and an actuator based on a magnetorheological fluid.

5. The throttle-by-wire pedal subsystem of claim 1, wherein execution, by the one or more processors, of the instructions in the control module to reconfigure the accelerator foot pedal unit to control the braking subsystem of the vehicle instead of the throttle and to reconfigure the haptic feedback of the accelerator foot pedal unit from the throttle-by-wire mode to the brake-by-wire mode are conditioned on the vehicle traveling at a speed below a predetermined speed threshold.

6. The throttle-by-wire pedal subsystem of claim 5, wherein the control module includes further instructions that when executed by the one or more processors cause the one or more processors to adjust the predetermined speed threshold in accordance with a location of the vehicle.

7. The throttle-by-wire pedal subsystem of claim 1, wherein the instructions in the pedal error detection module to detect the pedal error include instructions that when executed by the one or more processors cause the one or more processors to analyze one or more of external environmental sensor data and internal passenger-compartment sensor data.

8. The throttle-by-wire pedal subsystem of claim 7, wherein the instructions to analyze one or more of external environmental sensor data and internal passenger-compartment sensor data include instructions to perform one or more of:
   detecting one or more objects in an external environment of the vehicle based on the external environmental sensor data;
   detecting a gaze direction of the driver based on the internal passenger-compartment sensor data;
   detecting a change in grip of the driver on a steering wheel of the vehicle based on the internal passenger-compartment sensor data;
   detecting a facial expression of the driver based on the internal passenger-compartment sensor data;
   detecting an emotional state of the driver based on the internal passenger-compartment sensor data;
   detecting a sudden increase in pressure on the accelerator foot pedal unit based on the internal passenger-compartment sensor data; and
   detecting one or more of an exclamation, a facial expression, and a gesture of a passenger in the vehicle based on the internal passenger-compartment sensor data.

9. A non-transitory computer-readable medium for controlling a throttle-by-wire pedal subsystem of a vehicle and storing instructions that when executed by one or more processors cause the one or more processors to:
   detect a pedal error in which a driver of the vehicle mistakenly actuates an accelerator foot pedal unit of the vehicle instead of a separate brake pedal of the vehicle, wherein the accelerator foot pedal unit controls a throttle of the vehicle; and
   perform the following in response to the detected pedal error:
      reconfigure the accelerator foot pedal unit to control a braking subsystem of the vehicle instead of the throttle; and
      reconfigure a haptic feedback of the accelerator foot pedal unit from a throttle-by-wire mode to a brake-by-wire mode.

10. The non-transitory computer-readable medium of claim 9, wherein the instructions include instructions to, in response to a predetermined condition, cancel reconfiguration of the accelerator foot pedal unit, the accelerator foot pedal unit reverting to control of the throttle of the vehicle and the haptic feedback of the accelerator foot pedal unit reverting to the throttle-by-wire mode.

11. The non-transitory computer-readable medium of claim 10, wherein the predetermined condition is one of:
   the driver reducing pressure on the accelerator foot pedal unit to a predetermined level; and
   the driver completely releasing pressure on the accelerator foot pedal unit and actuating the separate brake pedal of the vehicle.

12. The non-transitory computer-readable medium of claim 9, wherein the instructions to reconfigure a haptic feedback of the accelerator foot pedal unit from a throttle-by-wire mode to a brake-by-wire mode include instructions to adjust a resistance level of the accelerator foot pedal unit by controlling one or more of a linear electric motor, a rotary electric motor, and an actuator based on a magnetorheological fluid.

13. A method of controlling a throttle-by-wire pedal subsystem of a vehicle, the method comprising:
   detecting a pedal error in which a driver of the vehicle mistakenly actuates an accelerator foot pedal unit of the vehicle instead of a separate brake pedal of the vehicle, wherein the accelerator foot pedal unit controls a throttle of the vehicle; and
   performing the following in response to the detected pedal error:
      reconfiguring the accelerator foot pedal unit to control a braking subsystem of the vehicle instead of the throttle; and
      reconfiguring a haptic feedback of the accelerator foot pedal unit from a throttle-by-wire mode to a brake-by-wire mode.

14. The method of claim 13, further comprising:
   canceling reconfiguration of the accelerator foot pedal unit in response to a predetermined condition, the accelerator foot pedal unit reverting to control of the throttle of the vehicle and the haptic feedback of the accelerator foot pedal unit reverting to the throttle-by-wire mode.

15. The method of claim 14, wherein the predetermined condition is one of:
   the driver reducing pressure on the accelerator foot pedal unit to a predetermined level; and
   the driver completely releasing pressure on the accelerator foot pedal unit and actuating the separate brake pedal of the vehicle.

16. The method of claim 13, wherein reconfiguring the haptic feedback of the accelerator foot pedal unit from the throttle-by-wire mode to the brake-by-wire mode includes adjusting a resistance level of the accelerator foot pedal unit by controlling one or more of a linear electric motor, a rotary electric motor, and an actuator based on a magnetorheological fluid.

17. The method of claim 13, wherein the reconfiguring the accelerator foot pedal unit to control the braking subsystem of the vehicle instead of the throttle and the reconfiguring the haptic feedback of the accelerator foot pedal unit from the throttle-by-wire mode to the brake-by-wire mode are performed in response to the detected pedal error only if the vehicle is traveling at a speed below a predetermined speed threshold.

18. The method of claim 17, further comprising:
   adjusting the predetermined speed threshold in accordance with a location of the vehicle.

19. The method of claim 13, wherein detecting the pedal error includes analyzing one or more of external environmental sensor data and internal passenger-compartment sensor data.

20. The method of claim 19, wherein analyzing one or more of external environmental sensor data and internal passenger-compartment sensor data includes one or more of:
   detecting one or more objects in an external environment of the vehicle based on the external environmental sensor data;
   detecting a gaze direction of the driver based on the internal passenger-compartment sensor data;
   detecting a change in grip of the driver on a steering wheel of the vehicle based on the internal passenger-compartment sensor data;
   detecting a facial expression of the driver based on the internal passenger-compartment sensor data;
   detecting an emotional state of the driver based on the internal passenger-compartment sensor data;
   detecting a sudden increase in pressure on the accelerator foot pedal unit based on the internal passenger-compartment sensor data; and
   detecting one or more of an exclamation, a facial expression, and a gesture of a passenger in the vehicle based on the internal passenger-compartment sensor data.

\* \* \* \* \*